(12) United States Patent
Cortial (10) Patent No.: US 11,408,772 B2
(45) Date of Patent: Aug. 9, 2022

(54) PROCESS FOR PRODUCING AN INFRARED DETECTOR AND ASSOCIATED INFRARED DETECTOR

(71) Applicant: LYNRED, Palaiseau (FR)

(72) Inventor: Sébastien Cortial, Sassenage (FR)

(73) Assignee: LYNRED, Palaiseau (FR)

( * ) Notice: Subject to any disclaimer, the term of this patent is extended or adjusted under 35 U.S.C. 154(b) by 0 days.

(21) Appl. No.: 17/279,966

(22) PCT Filed: Nov. 26, 2019

(86) PCT No.: PCT/EP2019/082603
§ 371 (c)(1),
(2) Date: Mar. 25, 2021

(87) PCT Pub. No.: WO2020/120129
PCT Pub. Date: Jun. 18, 2020

(65) Prior Publication Data
US 2021/0389186 A1   Dec. 16, 2021

(30) Foreign Application Priority Data
Dec. 10, 2018 (FR) ........................................ 1872587

(51) Int. Cl.
*G01J 5/02* (2022.01)
*G01J 5/22* (2006.01)
(52) U.S. Cl.
CPC ................ *G01J 5/024* (2013.01); *G01J 5/22* (2013.01)

(58) Field of Classification Search
CPC ............. G01J 5/024; G01J 5/22; G01J 5/0853
See application file for complete search history.

(56) References Cited

U.S. PATENT DOCUMENTS

2013/0235210 A1    9/2013    Tinkler et al.

FOREIGN PATENT DOCUMENTS

| EP | 2743659 A1 | 6/2014 | |
| EP | 2902758 A1 | 8/2015 | |
| FR | 3089685 B1 * | 11/2020 | ............. G01J 5/024 |

OTHER PUBLICATIONS

International Search Report issued in PCT Patent Application No. PCT/EP2019/082603 dated Feb. 26, 2020.
Eminoglu, Selim et al., "MT3825BA: A 384x288-25 m ROIC for Uncooled Microbolometer FPAs," *Visual Communications and Image Processing*, vol. 9070 (Jun. 26, 2014).
(Continued)

*Primary Examiner* — David P Porta
*Assistant Examiner* — Gisselle M Gutierrez
(74) *Attorney, Agent, or Firm* — Marshall, Gerstein & Borun LLP (57) ABSTRACT

A method of manufacturing an infrared detector includes the steps of: hybrid bonding of a detection chip to a second chip; said hybrid bonding step being carried out by adhesion of contacts and of insulator layers of the two chips; removal of a substrate of said detection chip to reach a deep oxide layer; forming of conductive pads through said deep oxide layer to reach transistors present in a semiconductor layer; and forming of microbolometers suspended over said deep oxide layer and electrically connected to the conductive pads.

10 Claims, 4 Drawing Sheets

(56) References Cited

OTHER PUBLICATIONS

Lapadatu, Adriana et al., "High-performance long wave infrared bolometer fabricated by wafter bonding," *Visual Communications and Image Processing*, vol. 7660 (Apr. 5, 2010).
Temple, D. et al., "High Density 3-D Integration Technology for Massively Parallel Signal Processing in Advanced Infrared Plane Array Sensors," *Electronic Devices Meeting, 2006. IEDM '06. International, IEEE. PI*, (Dec. 1, 2006).
Hu, Y.H. et al., "Cu-Cu Hybrid Bonding as Option for 3D Ic Stacking," *2012 IEEE International Interconnect Technology Conference (IITC 2012)*: San Jose, California (Jun. 4, 2012).

\* cited by examiner

Fig. 1
State of the art

Fig. 2
State of the art

PROCESS FOR PRODUCING AN INFRARED DETECTOR AND ASSOCIATED INFRARED DETECTOR

DOMAIN OF THE INVENTION

The invention concerns the technical field of so-called "uncooled" infrared imaging, that is, the technical field of infrared detectors comprising microbolometers suspended over a substrate to decrease the influence of the temperature of the substrate and of the environment on the microbolometer performance.

The invention particularly advantageously applies to decrease the footprint of an infrared detector comprising a digital processing electronic system or any additional electronic function requiring increasing the available surface area, for example, an instantaneous readout circuit since, in this case, there is a need for additional surface area for each pixel of the detector.

BACKGROUND

Figure 1:
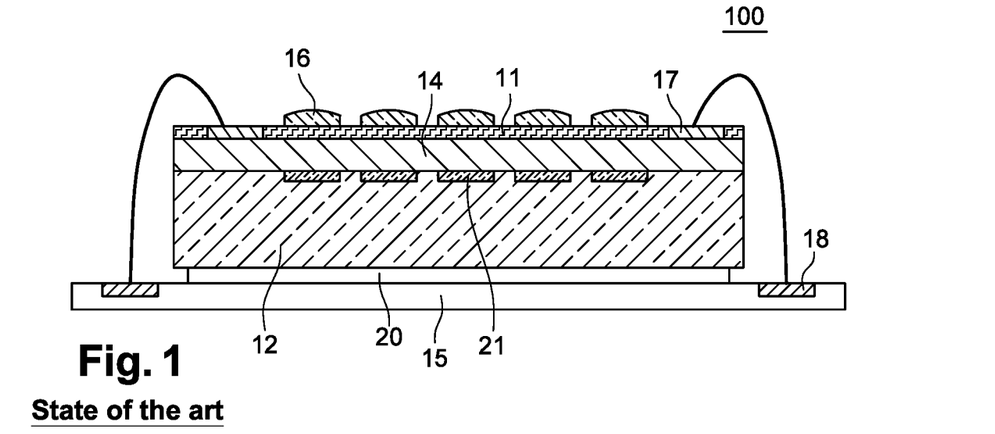
FIG. 1: a cross-section view of a detection chip directly assembled on an electronic board according to the state of the art.

As illustrated in FIG. 1 of the state of the art, an image detector in the visible spectrum generally appears in the form of a chip 100, called detection chip, which comprises elements 21 photosensitive to visible light and a readout circuit conventionally formed in CMOS technology. Photosensitive elements 21 are formed at the junction between a metal interconnection network 14 and a semiconductor substrate 12.

The readout circuit is formed of transistors formed in semiconductor substrate 12 and coupled to metal interconnection network 14. The readout circuit includes an analog-to-digital converter which delivers a raw digital video signal, onto output contacts 17 of detection chip 100, according to an image captured by photosensitive elements 21. Contacts 17 emerge from an oxide layer 11 and are coupled with contacts 18 arranged on an electronic board 15 having detection chip 100 bonded thereto. For example, the bonding may be performed by means of glue 20. Further, a microlens 16 is formed on oxide layer 11 to focus the rays onto photosensitive elements 21.

However, in this so-called "top side illumination" configuration, losses on the light flow are relatively significant, since the latter has to cross oxide layer 11 and metal interconnection network 14 before reaching photosensitive elements 21.

In the visible spectrum range, it is thus desired to flip detection chip 100 with respect to the light flow to limit losses.

Further, to improve the quality or the information contained in the digital video signal, for example, by applying an image correction and/or by associating a motion detection algorithm, it is known to associate a digital processing chip with detection chip 100. Similarly, these two chips are conventionally formed in different technologies since it is often not possible to integrate the digital processings directly in detection chip 100.

For these reasons, several technologies have been developed in the visible spectrum range to ease the connection of two chips of technologies that may be different from each other.

A first solution comprises assembling a first detection chip onto a second chip, for example, a digital processing chip, this second chip being itself assembled on an electronic board. The contacts of the second chip are then arranged around the location intended to receive the detection chip, and connections, for example, wire connections, are formed between the contacts of the second chip and the contacts of the detection chip and between the contacts of the second chip and the contacts of the electronic board. This solution has the defect of widely increasing the footprint and of generating noise or latencies in the communication between the two chips.

To limit this problem by suppressing the contacts around the detection chip, a second solution provides forming connection paths through the semiconductor substrate of the detection chip to form contacts under the detection chip to the processing chip.

However, the paths have to be positioned around the area occupied by the photosensitive elements, which still causes an increase in the footprint of the detection chip. Based on these technical solutions, several implementation variants are possible, for example, two chips may be assembled on two opposite surfaces of a same electronic chip by the connection path technique.

These two solutions are the only solutions implemented in the field of uncooled infrared imaging to associate the detection chip with another chip, for example a digital processing chip. In this specific technical field, the photosensitive elements correspond to microbolometers suspended over an upper layer of the detection chip to decrease the influence of the temperature of the substrate and of the environment on the microbolometers. To form these suspended microbolometers, the conventional technique comprises using at least one sacrificial layer deposited at the surface of the detection chip, and where openings are created to allow the deposition of conductive pads enabling to maintain the microbolometers suspended. On this sacrificial layer, the structure of the microbolometers is then formed so that the conductive pads can support the microbolometers during the removal of the sacrificial layer.

In visible imaging, it is known to form a face-to-face bonding between the two chips to further limit the footprint. The photosensitive elements are then illuminated through the semiconductor substrate of the detection chip, once it has been thinned. This configuration is called "bottom side illumination".

Figure 2:
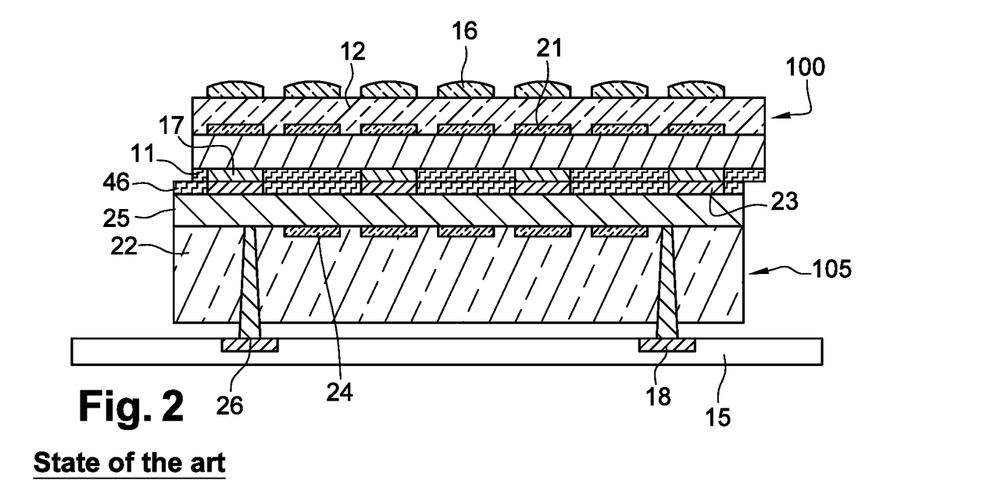
FIG. 2: a cross-section view of a chip of detection in the visible range assembled on a second chip according to the state of the art.

In the example of FIG. 2 of the state of the art, a first detection chip 100 is bonded to a second chip 105 comprising transistors 24 allowing additional readout or digital processing functions carried out in a solid substrate 22. Preferably, the bonding between the two chips 100, 105 is obtained by a "mixed bonding", that is, an adhesion between metal areas 17, 23 on the one hand and between oxide layers 11, 46 on the other hand. For example, the adhesion of metal areas 17, 23 may be obtained by thermocompression and the adhesion of oxide layers 11, 46 by molecular bonding.

This technique is known as "hybrid bonding".

Detection chip 100 is flipped and insulating layer 11 is arranged under semiconductor substrate 12. Contacts 17 flush with insulating layer 11 are positioned under detection chip 100 and they are placed opposite contacts 23 of second chip 105 during the hybrid bonding of the two chips 100, 105.

Semiconductor substrate 12 is then thinned to limit optical losses and optimize the illumination of photosensitive elements 21. The illumination is also controlled by a microlens 16 formed on semiconductor layer 12. The connections between electronic board 15 and second chip 105 are, for example, formed by through connection paths 26 emerging onto metallizations 25, and connected to contacts 18 of electronic board 15, arranged under second chip 105.

As a result, the footprint of the embodiment of FIG. 2 is smaller at the surface of electronic board 15 than the footprint of the embodiment of FIG. 1, while the embodiment of FIG. 2 integrates a second chip 105 integrating readout or digital processing functions. The estimated surface gain on the electronic board is in the order of from 30 to 40%.

However, this embodiment of FIG. 2 imposes a back-side illumination of photosensitive elements 21 since detection chip 100 is flipped.

Given the constraints of the manufacturing of the microbolometers suspended over the upper surface of the detection chip, it seems impossible to directly repeat this embodiment of FIG. 2 in the field of uncooled infrared imaging.

The technical problem of the present invention is to decrease the footprint of a detection chip associated with a second chip integrating additional readout or digital processing functions, in the field of uncooled infrared imaging, that is, for a detection chip comprising microbolometers suspended over an upper layer of the detection chip.

SUMMARY

To respond to this problem, the invention provides using a detection chip comprising a fully depleted semiconductor layer integrating transistors and other active elements allowing the readout function, before transferring the detection chip onto a second chip and forming the suspended microbolometers after the hybridization of the two chips together.

In the sense of the invention, a chip comprising a fully depleted semiconductor layer corresponds to a FDSOI-type (Fully Depleted Silicon On Insulator) CMOS technology This chip natively comprises a thin layer of insulator and a thin semiconductor layer interposed between the substrate and the metal interconnects of the CMOS circuit. The thin insulator layer is called deep oxide layer, and the thin semiconductor layer is called "silicon on insulator" (SOI) although other semiconductor materials may be used, such as germanium or gallium arsenide. This chip thus natively appears with a substrate, topped with a deep oxide layer, and then a thin semiconductor layer where transistors and other active elements are formed, and a metal interconnection network ending at the surface by an insulating layer through which electric contacts may emerge. The fineness of the semiconductor layer enables to obtain a circulation of charges across the entire thickness of the semiconductor layer.

For this purpose, according to a first aspect, the invention concerns a method of forming an infrared detector comprising the steps of:

hybrid bonding of a detection chip onto a second chip; and during the hybrid bonding;

said detection chip comprising a substrate topped with a deep oxide layer, a fully depleted semiconductor layer integrating transistors, a metal interconnection network, and an insulator layer;

said detection chip comprising a hybridization surface having contacts emerging from said insulator layer and connected to the metal interconnection network; and said second chip comprising a substrate having transistors and contacts emerging from an insulating layer at the level of a hybridization surface formed therein;

the hybrid bonding step being carried out by adhesion of the contacts and of the insulator layers of the two chips;

suppression of the substrate of said detection chip to reach said deep oxide layer;

forming of conductive pads through said deep oxide layer to reach the transistors present in said semiconductor layer; and forming of suspended microbolometers over said deep oxide layer and electrically connected to the conductive pads.

The invention thus enables to obtain an infrared detector integrating remote analog functions or advanced digital functions, formed by the second chip, while having a small surface area on an electronic board. It is thus possible to provide infrared detectors integrating complex functions at a lower production cost and having a very high compactness. The invention describes the use of transistors in the chips. Of course, these transistors may be completed with other active elements, particularly of diode type.

Further, the microbolometers may have structures equivalent to the current structures, so that the performance of the infrared detector is not decreased.

To increase the performance of microbolometers, the method may also comprise a step of forming a metal reflector on said deep oxide layer. This reflector results in sending back part of the thermal energy arriving onto the deep oxide layer towards the bolometric membrane of each bolometer, thus creating a so-called Fabry-Perot resonant cavity.

According to a specific provision of the invention, the method also comprises a step of contact forming through said deep oxide layer to reach an area of said semiconductor layer connected to the metal interconnection network, said metal reflector being formed on said contacts to form an electrode or a ground plane. Indeed, all the reflectors or electrodes may for example be coupled together to form a ground plane facing the transistors present in the semiconductor layer of the readout circuit.

Further, the microbolometers may be formed with known and tried methods, typically by using conductive pads formed in a sacrificial layer, and by forming a detection membrane on the sacrificial layer and connected to the conductive pads.

According to an embodiment, said semiconductor layer being divided, in the footprint of each pixel, into a plurality of distinct areas forming an injection transistor, the microbolometer forming step is carried out to connect in series each microbolometer onto an injection transistor. This injection transistor has the function of generating a controlled electric voltage on said microbolometer. Preferably, the distinct areas of said semiconductor layer form at least the poles of a MOSFET-type transistor.

Preferably, said hybrid bonding step is carried out by thermocompression of the contacts and by molecular bonding of the insulator layers of the two chips.

According to a second aspect, the invention concerns an infrared detector comprising:

a detection chip comprising transistors connected on the one hand to microbolometers suspended over a deep oxide layer and, on the other hand, through a metal interconnection network, to contacts emerging from an insulator layer; and a second chip integrating transistors connected to contacts emerging from an insulator layer;

the contacts and said insulator layer of said detection chip being bonded to the contacts and said insulator layer of said second chip.

The transistors of the second chip may have various functions and may be completed by other active elements, such as diodes. For example, the transistors complete those of the first chip to form the readout circuit, to support remote functions or to perform a digital processing of the signal originating from the detection chip. The complementarity of the transistors of the two chips enables to obtain processing functions applied pixel by pixel and no longer only generally, which is impossible with other conventional transfer techniques.

BRIEF DESCRIPTION OF THE DRAWINGS

The way to implement the present invention, as well as the resulting advantages, will better appear from the description of the following non-limiting embodiment, given as an indication, based on the accompanying drawings, among which FIGS. 1 and 8 show:

DETAILED DESCRIPTION

The present specification is described hereafter in reference to the hybridization of a single detection chip on a single second chip, this, for understanding and illustration simplicity reasons. In practice, the invention will most often be implemented to simultaneously bond a wafer integrating a plurality of detection chips to a wafer integrating a plurality of second chips.

Figure 3:
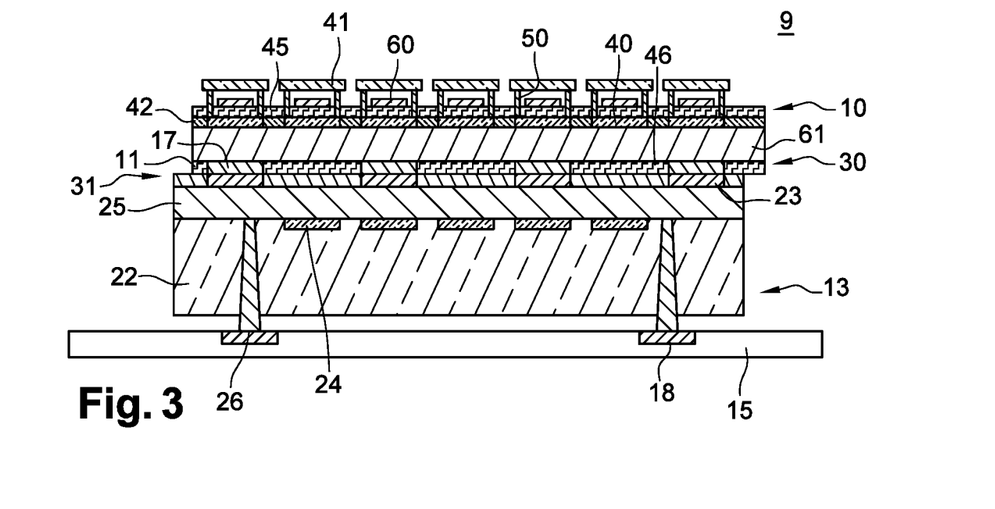
FIG. 3: a cross-section view of an infrared detector according to an embodiment of the invention.

FIG. 3 illustrates a cross-section view of an infrared detector 9 according to an embodiment of the invention. This infrared detector 9 comprises two distinct stacked chips to decrease the surface area of use of infrared detector 9 on an electronic board 15.

For this purpose, a detection chip 10 is assembled on a second chip 13, itself assembled on electronic board 15. The connections between electronic board 15 and second chip 13 are formed by connection paths 26 on a metal interconnection network 25 of second chip 13 and connected to contacts 18 of electronic board 15. Thus, by using connection paths 26, it is possible to connect second chip 13 via contacts 18 arranged under second chip 13. In practice, solder balls are conventionally arranged on contacts 18 to ensure an electric contact and a holding between connection paths 26 and contacts 18. As a variant, other connection types may be used between second chip 13 and electronic board 15.

This second chip 13 comprises transistors 24 that may be used with other active elements, such as diodes. For example, these transistors 24 enable to carry out different functions that cannot be integrated in the surface of the pixel of the detection circuit: simultaneous reading from the "snapshot"-type detection elements, or analog-to-digital conversion at the pixel level, or a digital processing of the signal originating from detection chip 10. As a variant, any other processing may be implemented by transistors 24 without changing the invention.

This second chip 13 also has contacts 23 emerging from an upper surface of the second chip 13 and connected to transistors 24. The upper surface of this second chip 13 corresponds to a hybridization surface 31 which is opposite to the surface of this second chip 13 intended to come into contact with electronic board 15.

In the sense of the specification, the formulation according to which the contacts "emerge" from a surface indicates that the contacts are coplanar with a terminal end of the chip at the level of the surface. However, in the drawings, the fineness of these contacts does not enable to represent them otherwise than schematically.

Detection chip 10 is bonded to this second chip 13 at the level of contacts 17 emerging from a hybridization surface 30 of detection chip 10. For this purpose, a hybrid bonding is performed so that hybridization surfaces 30 and 31 are planarized and contacts 17 and 23 are embedded in a silicon oxide matrix. A molecular bonding is obtained by hybrid bonding between the silicon oxide surfaces, while contacts 17 and 23, typically made of copper, are soldered by thermocompression.

Figure 5A:
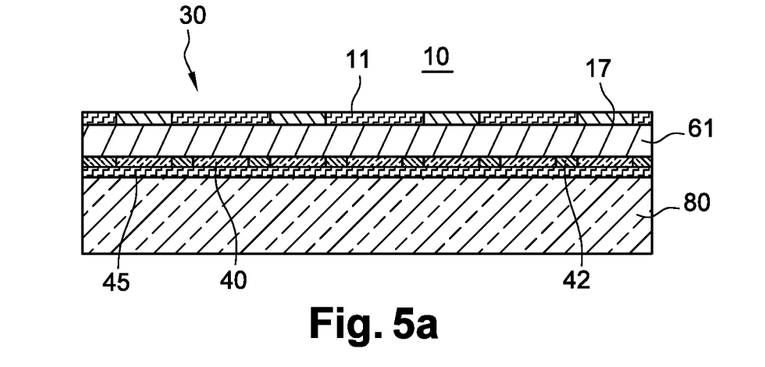
FIG. 5: a cross-section view of a step of the manufacturing of a detection chip (FIG. 5a) and of a second chip (FIG. 5b) of the infrared detector of FIG. 3.
Figure 5B:
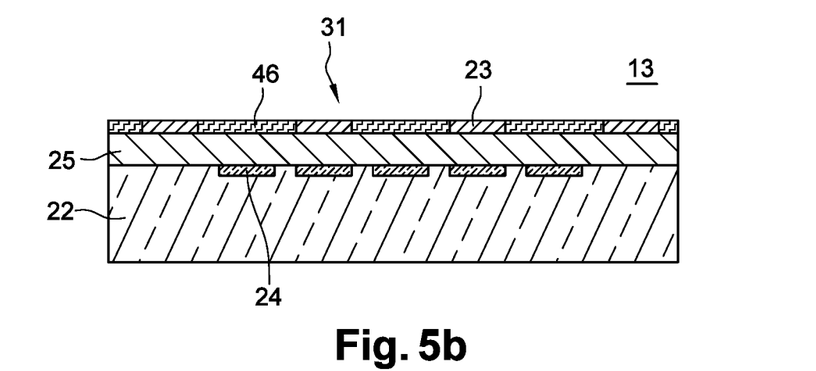
Figure 6:
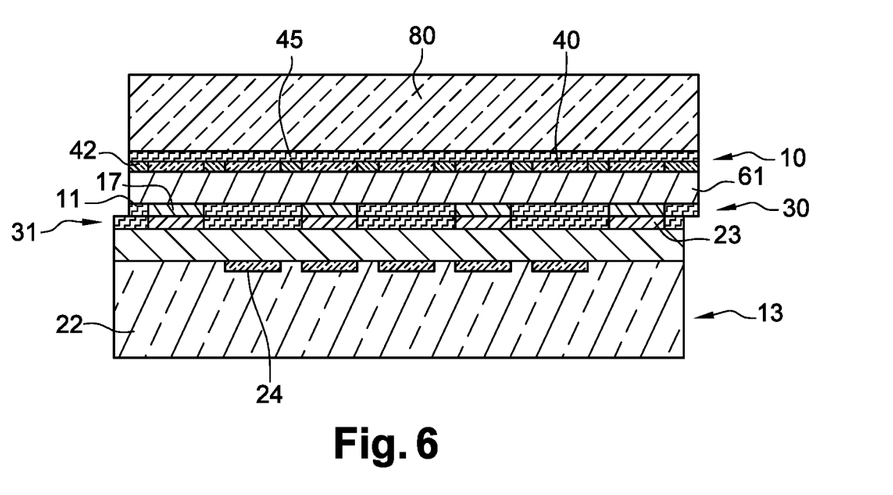
FIG. 6: a cross-section view of a step of hybrid bonding of the chips of FIG. 5.

As illustrated in FIGS. 5a and 5b, the elements forming detection chip 10 and second chip 13 are preferably formed before the hybrid bonding of detection chip 10 onto second chip 13. For this purpose, detection chip 10 is formed on a substrate 80 topped with a deep oxide layer 45, and then a fully depleted thin semiconductor layer 42 where transistors are formed, and a metal interconnection network 61 ending at the surface with an insulator layer 11 through which electric contacts 17 may emerge.

During the hybrid bonding, detection chip 10 is flipped so that contacts 17 are now arranged at the level of the lower portion of detection chip 10. After having matched the contacts 17 of detection chip 10 with the contacts 23 of second chip 13, it is possible for detection chip 10 to be slightly offset with respect to second chip 13, as illustrated in FIGS. 3 and 6 to 8.

Of course, the illustrated offset is exaggerated and only aims at illustrating the transfer which has occurred between the two chips 10 and 13. After the transfer of detection chip 10 onto second chip 13, the substrate 80 of detection chip 10 may be removed by physical or chemical processing to reach deep oxide layer 45.

Openings are then formed through deep oxide layer 45 to reach the transistors 40 of the semiconductor layer 42 of detection chip 10. To obtain a satisfactory electric continuity, an ohmic contact may be formed by siliciding on the surface of semiconductor layer 42 at the level of the previously-formed openings. To form each microbolometer 41, it is then possible to form two conductive pads 50a and 50b through a sacrificial layer deposited on deep oxide layer 45, so that the current is injected into microbolometer 41 through pad 50a and that the current returns to transistors 40 through pad 50b. Conductive pads 50 are arranged vertically in line with the previously-formed contacts.

Preferably, conductive pads 50 are arranged on specific areas of semiconductor layer 42, may highly conductive by a strong local doping, for example N++. This processing is performed well upstream of the manufacturing of the CMOS circuit by conventionally using implantation methods. Thus, each pixel of infrared detector 9 is directly formed on a MOSFET-type (Metal Oxide Semiconductor Field Effect Transistor) transistor and appropriately connected thereto to provide a controlled biasing to each microbolometer.

Figure 4A:
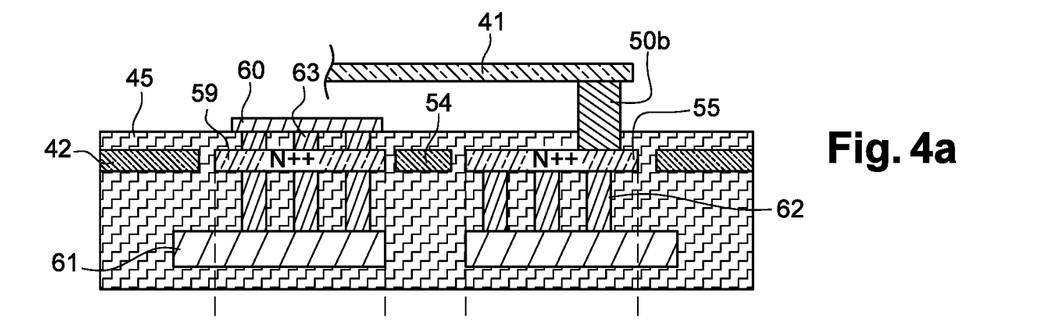
FIG. 4: a local top view of a detection element of the infrared detection element of FIG. 3 (FIG. 4b) showing an injection transistor and a microbolometer connected in series, as well as partial cross-section views along axis AA' (FIG. 4a) and axis BB' (FIG. 4c)
Figure 4B:
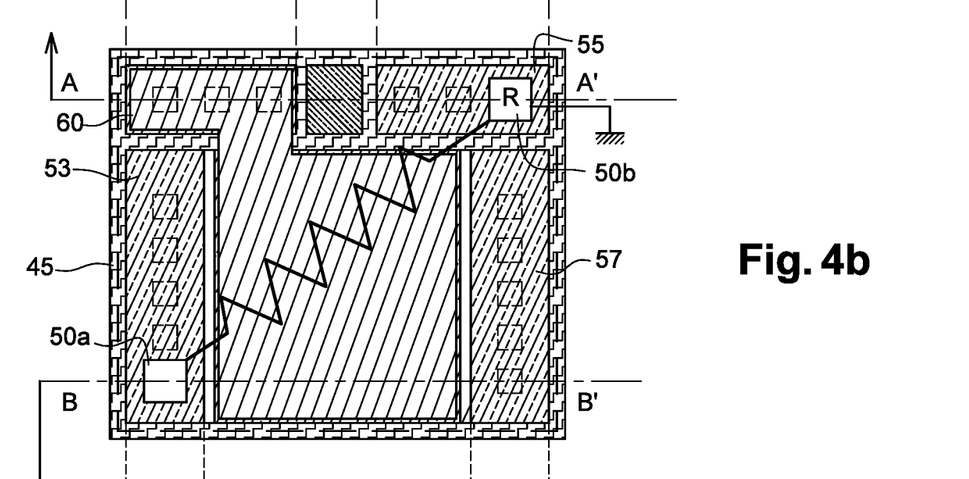
Figure 4C:
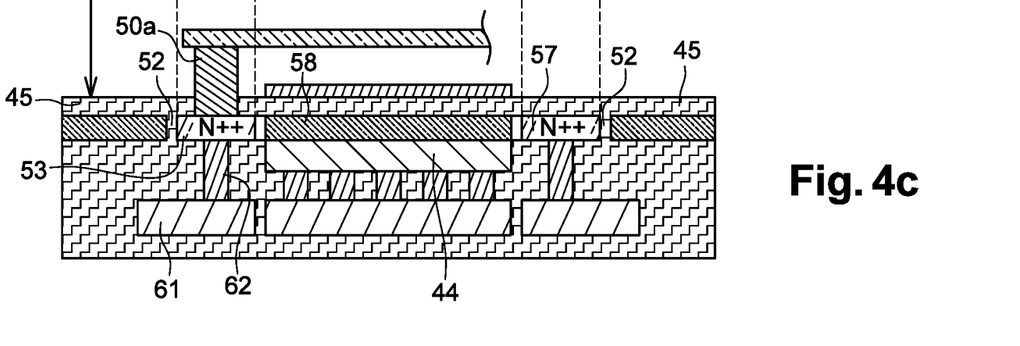

To form this MOSFET transistor, semiconductor layer 42 is for example structured with an N++-doped area 53 forming the drain of the MOSFET transistor, stacked to a lightly P-type doped area 58 forming the channel of the MOSFET transistor and also stacked to a second N++-doped area 57 forming the source of the MOSFET transistor. The looping back of the current after its flowing through the microbolometer is ensured by an N++-doped area 55, as illustrated in FIGS. 4a-4c.

The previously-described transistor is a PMOS-type transistor since the channel is P-type doped. Of course, this is an example only and the invention may also be formed on an NMOS-type transistor by inverting the doping types. Further, the space occupation described in FIGS. 4a-4c is a very simple example only. In reality, and especially for small pixels, the injection transistor is common to a group of 2 or 4 pixels, and it is surrounded with many other much smaller transistors which fulfill the function of switches.

Preferably, on manufacturing of the transistors on detection chip 10, trenches are formed in semiconductor layer 42 to delimit the perimeter of each MOSFET transistor or of the areas dedicated to the flowing of the current to the bolometer, after which these openings are filled by the deposition of an insulating material. This enables to insulate each transistor from electric disturbances originating from the neighboring areas.

Thus, as illustrated in cross-section BB', the structure of semiconductor layer 42 along a transistor thus comprises an insulator area 52, an N++-doped area 53, a P-doped area 58, an N++-doped area 57, and an insulator area 52. Cross-section AA' is formed of an N++-doped independent area 55 allowing the looping back of the current after its flowing through the bolometer, of an undoped and unused area 54, and of a second N++-doped area 59. The three areas 54, 59, and 55 are insulated by trenches filled with an insulating material 52.

Each microbolometer 41 is formed to be suspended from a conductive pad 50a connected on the drain 53 of the MOSFET transistor to reach the conductive pad 50b connected to the N++-doped area 55 forming the looping back of the current towards the circuit. P-type doped area 58, which corresponds to the transistor channel, is arranged between the two N++-doped areas 53 and 57 which respectively correspond to the drain and to the source of said transistor. The gate 44 of said transistor is coupled to the interconnection network 61 of the readout circuit of the detection chip, so that a controlled electric voltage may be applied thereto. Thus, said transistor enables to adjust the biasing applied to the adjoining bolometer. The transistors are then coupled by pads 62 to metal interconnection network 61.

Preferably, to improve the detection properties of the microbolometer 41 formed on pads 50a and 50b, it is possible to cover the surface of deep oxide 45, on an area corresponding to gate 58, with a reflector 60. According to a specific provision of the invention, this reflector 60 may also be connected to the N++-doped area 59 of semiconductor layer 42, the latter being itself connected to the internal interconnection network 61 of the readout circuit of the detection chip. Thus, reflector 60 also enables to apply to the surface opposite to the transistor gate, an electric field on the channel of the MOSFET transistor through deep oxide 45. This device enables to confine the charges which flow through area 58 at the center of semiconductor layer 42.

Figure 7:
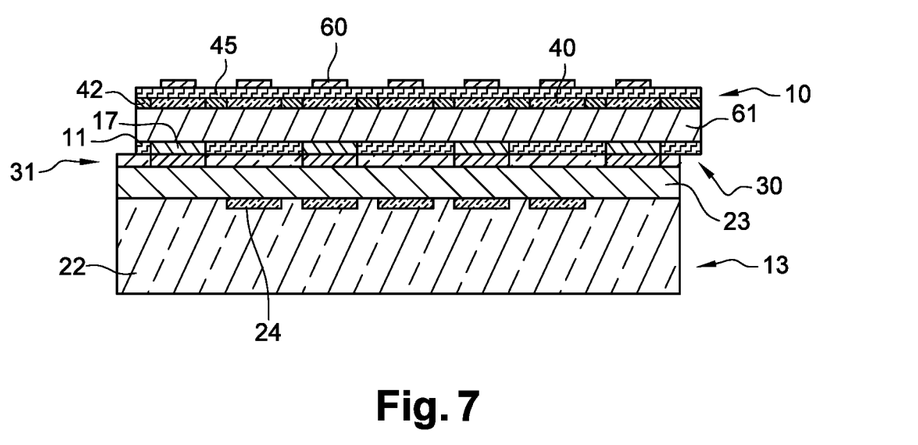
FIG. 7: a cross-section view of a step of forming of pads on the detection chip of FIG. 6.
Figure 8:
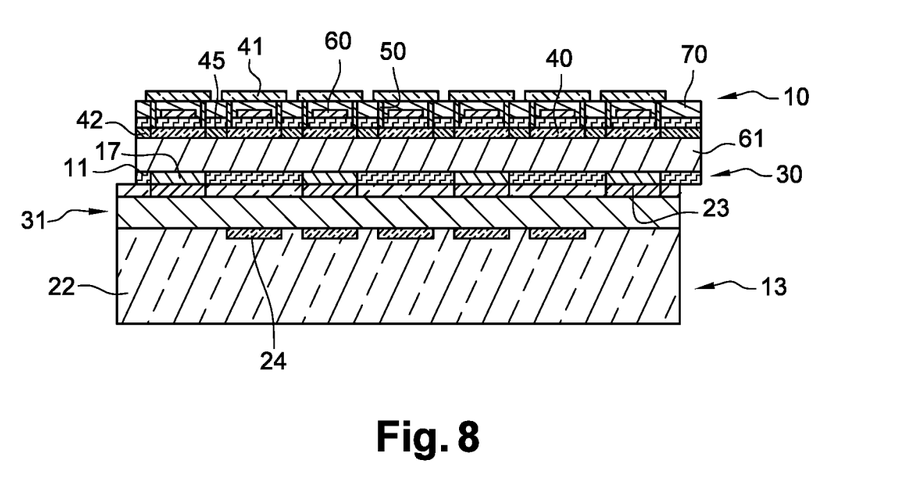
FIG. 8: a cross-section view of a step of forming of microbolometers on the pads of FIG. 7.

As illustrated in FIG. 7, reflector 60 may be deposited on deep oxide layer 45 before the forming of conductive pads 50. Thus, after the bonding of detection chip 10 to second chip 13 by hybrid bonding and then removal of the substrate of chip 10, the embodiment may comprise the steps of:
creation of openings in deep oxide layer 45 above areas 53 and 55 to receive conductive pads 50a and 50b, and above area 59 to connect reflector 60;
forming of ohmic contacts in the openings;
forming of reflector 60 on deep oxide layer 45;
deposition of sacrificial layer 70;
forming of conductive pads 50a, 50b; and
forming of microbolometers 41.

It is also possible to protect the ohmic contacts above areas 53 and 55 during the forming of reflector 60 by forming these contacts after the forming of reflector 60. Thus, the embodiment may comprise the steps of:
creation of an opening in deep oxide layer 45 above area 59 to connect reflector 60;
forming of ohmic contacts in the opening;
forming of reflector 60 on deep oxide layer 45;
creation of openings in deep oxide layer 45 above areas 53 and 55 to receive conductive pads 50a and 50b;
forming of ohmic contacts in the openings;
deposition of sacrificial layer 70;
forming of conductive pads 50a, 50b; and
forming of microbolometers 41.

The invention thus enables to obtain an infrared detector 9 using a small surface area on an electronic board 15 while integrating advanced functions, such as the simultaneous reading from the "snapshot"-type detection elements, or analog-to-digital conversion at the level of the pixel, or digital processings.

The invention claimed is:

1. A method of manufacturing an infrared detector comprising the steps of:
hybrid bonding of a detection chip onto a second chip, and during the hybrid bonding;
said detection chip comprising a substrate topped with a deep oxide layer, a fully depleted semiconductor layer integrating transistors, a metal interconnection network, and an insulator layer;
said detection chip comprising a hybridization surface having contacts emerging from said insulator layer, and connected to the metal interconnection network; and
said second chip comprising a substrate having transistors and contacts emerging from an insulator layer at the level of a hybridization surface formed therein;
the hybrid bonding step being formed by adhesion of the contacts and of the insulator layers of the two chips;
removal of the substrate of said detection chip to reach said deep oxide layer;
forming of conductive pads through said deep oxide layer to reach the transistors present in said semiconductor layer; and
forming of microbolometers suspended over said deep oxide layer and electrically connected to the conductive pads.

2. A method of manufacturing an infrared detector according to claim 1, wherein the method also comprises a step of forming a metal reflector on said deep oxide layer.

3. A method of manufacturing an infrared detector according to claim 2, wherein the method also comprises a step of forming of contacts through said deep oxide layer to reach an area of said semiconductor layer connected to the metal interconnection network, said metal reflector being formed on said contacts to form an electrode or a ground plane.

4. A method of manufacturing an infrared detector according to claim 1, wherein said semiconductor layer is divided, in the footprint of each pixel into a plurality of distinct areas forming an injection transistor, the step of forming microbolometers being carried out to connect in series each microbolometer onto an injection transistor.

5. A method of manufacturing an infrared detector according to claim 4, wherein the distinct areas of said semiconductor layer form a MOSFET-type transistor.

6. A method of manufacturing an infrared detector according to claim 1, wherein the step of forming conductive pads and the step of forming microbolometers suspended over said deep oxide layer are carried out by the use of at least one sacrificial layer.

7. A method of manufacturing an infrared detector according to claim 1, wherein said hybrid bonding step is carried out by thermocompression of the contacts and by molecular bonding of the insulator layers of the two chips.

8. An infrared detector comprising:
a detection chip comprising transistors,
connected on the one hand to microbolometers suspended over a deep oxide layer, and
connected on the other hand, through a metal interconnection network, to contacts emerging from an insulator layer; and
a second chip integrating transistors connected to contacts emerging from an insulator layer;
wherein the contacts and the insulator layer of said detection chip are bonded to the contacts and the insulator layer of said second chip.

9. An infrared detector according to claim 8, wherein the transistors of said second chip complete the transistors of said detection chip to form a circuit for reading from the microbolometers.

10. An infrared detector according to claim 8, wherein the transistors of said second chip perform a digital processing of a signal originating from said detection chip.

* * * * *